Oct. 30, 1928.
L. P. WOLF
1,689,759
SECTIONAL HARROW
Filed June 28, 1926
2 Sheets-Sheet 1
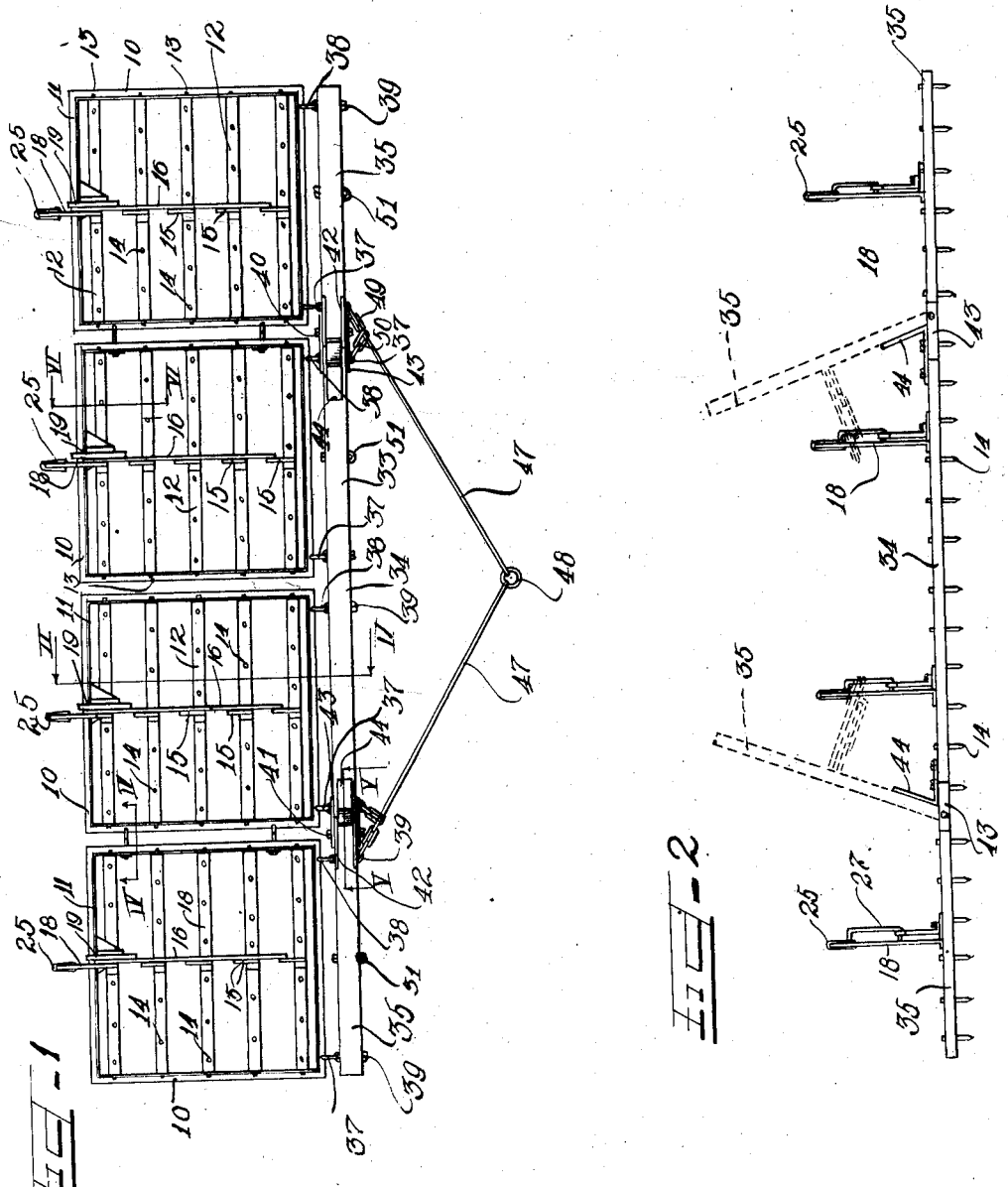
INVENTOR
Leonard P. Wolf
BY Charles W. Hills
ATTYS Oct. 30, 1928.

L. P. WOLF

SECTIONAL HARROW

Filed June 28, 1926

Inventor
Leonard P. Wolf
By Charles Hill Attys

Patented Oct. 30, 1928.

1,689,759

UNITED STATES PATENT OFFICE.

LEONARD P. WOLF, OF BURLINGTON, WISCONSIN.

SECTIONAL HARROW.

Application filed June 28, 1926. Serial No. 118,966.

This invention relates to harrows and more particularly to sectional harrows, although certain features thereof may be used with equal advantage for other purposes.

It contemplates more especially the provision of a harrow or implement of varying spread which is readily adjustable so as to permit its use in restricted places.

In implements of the character mentioned, it is desirable to provide standard units of suitable form which bear a relation to each other to facilitate their assembly or dismantling so as to produce with ease, a structure of any desirable spread. Moreover, it is to be noted that shipment of such an implement is greatly facilitated owing to the fact that it can be readily dismantled and the units conveniently handled with ease and rapidity.

Further, devices of known construction, are usually of such spread that they necessarily must be drawn endwise through restricted areas. This necessitates a changed application of the motive power, which delays the progress thereof, consumes time, and seriously inconveniences the attendant.

One object of the present invention is to improve the operation and simplify the construction of devices of the character mentioned.

Another object is to provide a sectional harrow or similar implement having a variable spread.

Still another object is to provide improved means to facilitate the assembly of the constituent sections of an implement.

A further object is to provide an improved implement which may be readily adjusted for effective use in areas of varying magnitudes.

A still further object is to provide a sectional implement which may be assembled and dismantled with ease in order to permit convenient handling thereof.

Other objects and advantages will appear from the following description of an illustrated embodiment of the present invention.

In the drawings:

Figure 1 is a plan view of an implement embodying features of the present invention.

Figure 2 is a view of an elevation of the implement shown in Figure 1.

Figure 3:
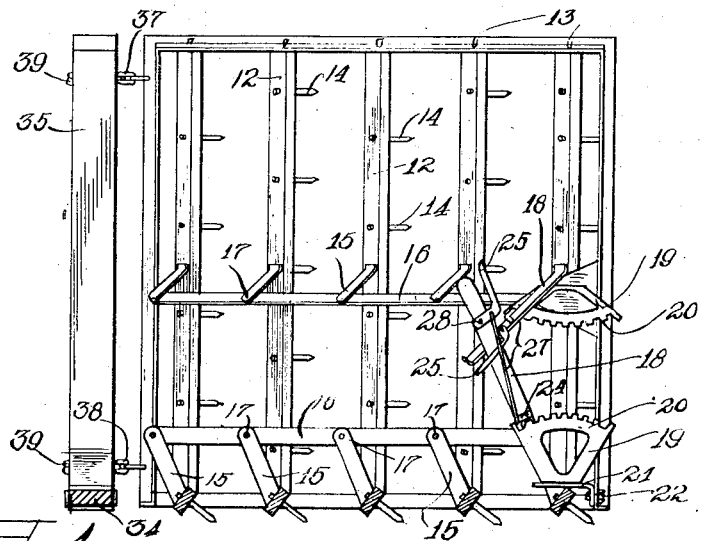
Figure 3 is a sectional view taken substantially along line II—II of Figure 1, an end section thereof being shown in an elevated position.
Figure 4:
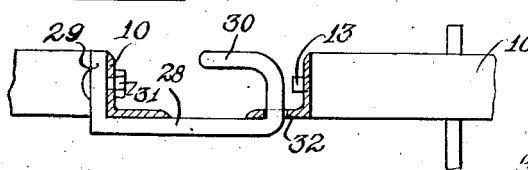
Figure 4 is a sectional view taken substantially along line IV—IV of Figure 1.
Figure 5:
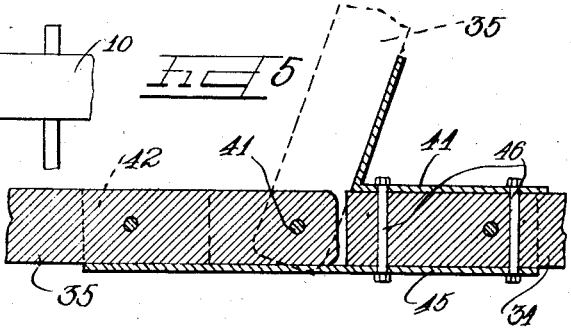
Figure 5 is a sectional view taken substantially along line V—V of Figure 1.
Figure 6:
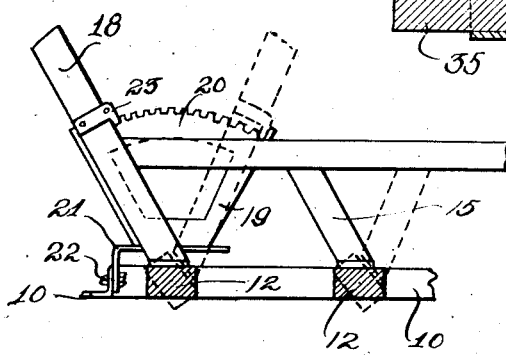
Figure 6 is a fragmentary sectional view taken substantially along line VI—VI of Figure 1.

The implement selected for illustration consists of a plurality of units 10, in this instance four, constituting a sectional frame. Each section is preferably composed of an angular metallic bar 11 which is bent intermediate the ends thereof to define a substantially rectangular frame closed at the ends thereof in any appropriate manner. Rotatably mounted within the sections 10 are a plurality of parallel spaced supporting bars 12 of wood or any other suitable material. The bars 12 are mounted on suitable horizontal pins 13 projecting through the sides of the frame 10 between which the bars 12 are suspended. Harrow means, in this instance, the pointed pins 14 constituting teeth, are securely fixed in spaced relation, to the bars 12 and are staggered with respect to the pins in next succeeding bar so that the area covered by the frames is effectively harrowed. The pins 14 are preferably driven into the bars so that they may be driven down from time to time to compensate for the ordinary wear thereon.

Crank arms 15 are secured in an appropriate manner to each of the bars 12 along the median line thereof so as to facilitate rotation or angular adjustment of the pins fixed to the bars 12. The crank arms of each section are pivotally secured at their free ends to a beam 16 by means of the pins 17 of standard construction. A hand lever 18 is rigidly fixed to one of the bars preferably the last supporting bar 12 of each section, and the beam 16 is pivotally secured to the lever 18 intermediate the ends thereof so that angular movement may be imparted to each of the supporting bars by the lever 18. In order to retain the bars 12 in different angular positions, a segment 19 having a notched arcuate surface 20, is secured to a bracket 21 which is fixed in any appropriate manner to the frame 10 as at 22. A tooth 23 is pivotally secured to the lever 18 as at 24 for cooperation with the notched segment, whereby the lever 18 may be maintained in any angular position within the range of the notched surface 20. The tooth 23 is selectively controlled for sliding engagement with the notches by virtue of a secondary lever 25 which confronts the extremity of the hand lever 18 and is movable relative thereto by virtue of its pivoted mounting on the pin 26. The lever 25 is operatively connected to the tooth 23 by means of a rod 27 provided with curved ends pivotally associated in suitable apertures provided in the tooth 23 and the lever 25. A spring or any other suitable means may be employed to normally urge the tooth 23 in engagement with the notched periphery 20 of the segment 19.

With the arrangement of parts thus far described, it will be apparent that the bars 12 of each section may be turned and held in different adjusted positions within the limits defined by the segment 19.

To detachably secure the sections 10 together so that an implement of any desired spread may be provided, means are employed on the adjacent edges of each section to facilitate the assembling and dismantling of the sections. The cooperating means, in this instance, comprises a hook 28 having an upstanding tang 29 and a curved extremity 30 spaced therefrom. The tang 29 is secured to the inner side of the angle iron constituting the frame 10, by means of any suitable fasteners such as the bolts 31. The adjacent angle bar of the next succeeding section is provided with suitable apertures 32 in the horizontal portion thereof to freely receive the curved end 30 of the member 28 so that the section 10 to which the hook 28 is secured, is tilted sufficiently so that the adjacent sections can be conveniently dismantled.

A beam 33 comprising in this instance a midsection 34 substantially equal in length to the intermediate pair of frames 10, has pivotally secured to the extremities thereof the end beams 35 substantially equal in length to the end sections. A pair of spaced links 37 and 38 are secured to the frame of each section at spaced points for engagement with the studs 39 on the beam 33 so that the extremities thereof which are shaped to define eyes, cooperates therewith to maintain the beam 33 spaced from the sections 10, parallel to the bars 12, as clearly shown in Figure 1. The end portions 35 are pivoted to the midsection 34 of the beam 33 by means of the bolts 40 and 41 which extend through the contacting endplates 42 and 43 secured to the members 34 and 35 respectively. Secured to the extremities of the member 34 on the top surface thereof is an angular plate 44 and on the bottom thereof a straight plate 45, which are held in position by means of the bolts 46 whereby the end sections can be maintained in either a horizontal or elevated position.

The levers 18 are so positioned on each section so that the end sections may be maintained in an elevated position by the interlocking of the levers 18, as clearly indicated in Figure 3, owing to the fact that the shank of one of the levers may be received between the extremities of the adjacent hand and thumb levers 18 and 25, respectively.

In order to conveniently and effectively pull the implement over the surface, a brace consisting of tension rods 47 joined at the extremities thereof by a ring 48, is secured to the beam 33 by means of the links 49 and 50 associated with the free extremities of the rods and secured to the adjacent ends of the segments comprising the beam 33, thus motive power of any character may be secured to the ring 48 by a clevis or other suitable means.

It will be apparent that an implement has been provided which is simple, durable and of adjustable spread to facilitate its use in restricted places. It is to be noted that any number of sections may be employed and that suitable eye bolts 51 may be provided in the beam 33 at spaced points to facilitate the use of any of the sections independent of the others to meet the needs of any locality or area.

I am aware that numerous details of construction may be varied through a wide range without departing from the principles of this invention, and I therefore do not purpose limiting the patent granted otherwise than necessitated by the prior art.

I claim as my invention:

1. In a sectional harrow, spaced frames pivotally secured together, teeth carrying crossbars journaled in said frames, means including a lever individual to each frame for rotating said crossbars, a foldable beam secured to said frames, and angular plates adjacent the joints in said beam to limit the pivotal movement of the foldable portions thereof with the corresponding frames and act as a rest therefor, said levers being interlockable to maintain certain of said frames in elevated position.

2. In a harrow, spaced teeth carrying frames pivotally connected, a foldable beam connected to said frames, said beam including a fixed portion, and means on said beam for limiting the pivotal movement of said frames, said means including straight irons extending outwardly from said fixed portion for abutment by pivotal portions of said beam when said frames are in useful position, and angle irons on said fixed portion for abutment by pivotal portions of said beam when certain of said frames are in non-useful position.

3. In a harrow, a foldable member having a fixed and pivotal portions, teeth carrying means connected to the fixed portion of said member, teeth carrying means connected to pivotal portions of said member, apertured members on certain of said means, and inverted hooks having a rearwardly bent prong thereon secured to others of said means, said hooks being engageable in the apertures of said members from the underside thereof.

In testimony whereof I have hereunto subscribed my name.

LEONARD P. WOLF.